(12) United States Patent
Motzigkeit

(10) Patent No.: US 6,743,976 B2
(45) Date of Patent: Jun. 1, 2004

(54) CONDUIT CHANNEL FOR INSULATED CONDUCTOR LINES AND DEVICES OF AN IN-FLIGHT ENTERTAINMENT SYSTEM IN AN AIRCRAFT

(75) Inventor: Daniel Motzigkeit, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/446,883

(22) Filed: May 27, 2003

(65) Prior Publication Data
US 2003/0221851 A1 Dec. 4, 2003

(30) Foreign Application Priority Data
May 28, 2002 (DE) ......................... 102 23 840

(51) Int. Cl.[7] ............................... H02G 3/04
(52) U.S. Cl. ................. 174/48; 174/68.1; 248/205.1
(58) Field of Search ............... 174/48, 49, 68.1, 174/21 R, 706; 52/220.1; 248/205.1; 220/3.6, 3.7

(56) References Cited

U.S. PATENT DOCUMENTS 3,761,603 A * 9/1973 Hays et al. ............... 174/101
6,058,288 A    5/2000 Moreau et al.
6,249,913 B1   6/2001 Armstrong et al.
6,576,834 B2 * 6/2003 Coutant et al. ............ 174/48
2001/0022231 A1 * 9/2001 Dyer ........................ 174/48

* cited by examiner

Primary Examiner—Dhirubhai R Patel
(74) Attorney, Agent, or Firm—W. F. Fasse; W. G. Fasse (57) ABSTRACT

A conduit channel is recessed in an aircraft cabin floor, extends longitudinally along the cabin, and receives electrical devices and conductor lines of an in-flight entertain system. The conduit channel is formed by a cover plate and a Z-sectional member including a vertical middle web and horizontal upper and lower flanges projecting in opposite directions from upper and lower edges of the middle web. The lower flange is supported on a floor crossbeam. The upper flange is supported on a side flange of a longitudinal seat mounting rail. An edge rim of the cover plate rests on the upper flange and has keyhole-shaped cable pass-through openings spaced along the longitudinal direction. A cable guide element is mounted on a selected pass-through opening to guide a cable out of the channel. Unused pass-through openings are closed by blind inserts. The devices and conductor lines can be variably arranged in the channel.

19 Claims, 5 Drawing Sheets

CONDUIT CHANNEL FOR INSULATED CONDUCTOR LINES AND DEVICES OF AN IN-FLIGHT ENTERTAINMENT SYSTEM IN AN AIRCRAFT

PRIORITY CLAIM

This application is based on and claims the priority under 35 U.S.C. §119 of German Patent Application 102 23 840.5, filed on May 28, 2002, the entire disclosure of which is incorporated herein by reference.

FIELD OF THE INVENTION

The invention relates to a conduit channel or raceway for receiving, guiding and protecting insulated conductor lines such as insulated electrical cables and/or optical fiber cables, as well as electrical and/or optical devices, as components of an in-flight entertainment system or the like in an aircraft.

BACKGROUND INFORMATION

Modern passenger transport aircraft are equipped with an in-flight entertainment (IFE) system that provides entertainment, news, instructions, or other information and data through audio and/or video channels to the passengers. To realize such an in-flight entertainment system, a great number of insulated conductor lines such as insulated electrical cables and/or optical fiber cables as well as electrical and optical devices must be laid out and installed in the cabin, to deliver the in-flight entertainment content to the individual passengers seated in the passenger seats. To achieve this, the known Airbus aircraft are equipped with many floor disconnect boxes (FDB) and power floor disconnect boxes (PFDB) installed in the area of the floor of the passenger cabins of the aircraft. Particularly, these boxes are arranged distributed along the lengthwise axis direction of the aircraft, over the entire floor area of the passenger cabin or cabins.

Data lines and power supply lines are connected to these boxes, in order to provide the information and the power supply to the end use devices and/or other electrical connections of the in-flight entertainment system provided on or in connection with the passenger seats, by means of individual seat cabling. In the present conventional aircraft, the seat cabling is carried out via visible cable channels that are installed above the floor next to or alongside the seat rails on the carpet covering the floor. The cable channels are positioned under plastic covers below the seats of the seat configuration, spaced slightly above the actual floor structure.

Also, fixed openings or recesses with prescribed locations and dimensions are provided in the floor, for receiving the above mentioned floor disconnect boxes, from which the extending cables are then guided or laid out to the individual seats. In this context, the boxes are installed in a prepared floor plate of large dimensions, with a carrying or supporting frame and a lid, whereby the cables or cable bundles extending therefrom leave the respective box in the area of the screw-on lid or cover of the box. This involves a rather complicated, time consuming and costly installation, which is also inflexible and not adaptable to different conditions or layouts.

Despite the advantage of providing a good accessibility of the cable installation, the known channel and cable installation suffer significant disadvantages. For example, the installed cables lie relatively unprotected and visibly in the cabin, i.e. under thin plastic covers on top of the cabin floor. Also, partition walls that separate the overall cabin area into several zones cannot (or cannot easily) be skirted around by the cable or cable channels due to the channel installation protruding slightly above the floor structure. Morever, the fixed installation locations of the floor disconnect boxes only allow a relatively minimal and constrained flexibility of the seat cabling, which is influenced by the location and the seat configuration of the respective seats. Variations or different layouts, for example at the request of a later operator of the passenger aircraft, cannot be achieved or can only be achieved with significant limitations. There are further visual disadvantages of the conventional installation, which primarily arise from the cable conduit channel arranged above the floor, as well as the installation locations of the floor disconnect boxes, and also the visible connection cabling of the seats of respective seat rows (i.e. from seat to seat). Finally, the danger exists, that the exposed and protruding components of the conventional arrangement present a constant tripping hazard for passengers and flight crew personnel, as well as the threat of damage being caused to the devices and the connection cables. There is a great need to overcome these significant disadvantages and problems.

SUMMARY OF THE INVENTION

In view of the above, it is an object of the invention to provide a conduit channel arrangement for receiving or housing the conductor lines and devices of an in-flight entertainment system of an aircraft that is improved so as to achieve an uncomplicated and flexible laying of the cables for the individual seats, using a conductor line and device channel integrated into the floor, which avoids tripping hazards for passengers and flight crew personnel, and avoids the risk of damage being caused to the devices and the connection cables installed in the channel arrangement. Another object of the invention is to allow for a flexible variation of the installation location of the various devices and connection cables for the seats within the channel, while also receiving both cables and devices combined within the same channel. The invention further aims to avoid or overcome the disadvantages of the prior art, and to achieve additional advantages, as apparent from the present specification.

The above objects have been achieved according to the invention in a transport aircraft including an in-flight entertainment system incorporating insulated conductor lines and devices. The aircraft includes a fuselage that extends longitudinally in a longitudinal axis direction and that includes a cabin floor incorporating a crossbeam with a horizontal crossbeam support surface extending in a transverse direction transversely across the longitudinal axis direction and a sectional profile member with a horizontal profile support surface extending along the longitudinal axis direction. Throughout this specification, the terms "horizontal" and "vertical" respectively mean substantially (e.g. within +/−5°) along or parallel to the transverse plane on the pitch axis and the upright longitudinal plane on the yaw axis of the aircraft respectively, although the true orientations vary depending on the flight attitude of the aircraft, for example.

The improved conduit channel arrangement according to the invention is adapted to receive the insulated conductor lines and the devices of the in-flight entertainment system. The conduit channel arrangement includes a conduit channel or raceway formed of a light metal sectional member having a double-L or Z-sectional shape including a middle channel web standing vertically or perpendicularly on the crossbeam support surface, an upper channel flange that is perpendicularly bent from an upper edge of the middle channel web so as to protrude laterally there-from and rest supported on the profile support surface, as well as a lower channel flange that forms the channel floor, and that is bent perpendicularly from the lower edge of the middle channel web to protrude horizontally laterally therefrom in a direction opposite the upper channel flange, and that is arranged and supported on the horizontal crossbeam support surface. The conduit channel arrangement further includes a plate-like channel cover or lid having an edge rim extending in the longitudinal axis direction, with several cable pass-through openings provided therein spaced apart from one another along the longitudinally extending edge of the channel cover. A respective conductor line or conductor bundle received in the channel can be guided out through a respective one of the cable pass-through openings. The edge rim of the channel cover rests supportedly with its rim portion on the upper channel flange.

With this structure of the conduit channel arrangement according to the invention, the channel is integrated and recessed flushly into the aircraft cabin floor, and is structurally supported on the structural members incorporated in the floor. The longitudinally extending cables or insulated conductor lines are thus received in the longitudinally extending channel recessed into the floor, and they are not exposed above the floor. This channel arrangement also allows great flexibility and adaptability in the particular location and layout of the connection cabling extending from the channel or raceway to the individual seats or seat rows.

BRIEF DESCRIPTION OF THE DRAWINGS

In order that the invention may be clearly understood, it will now be described in detail in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
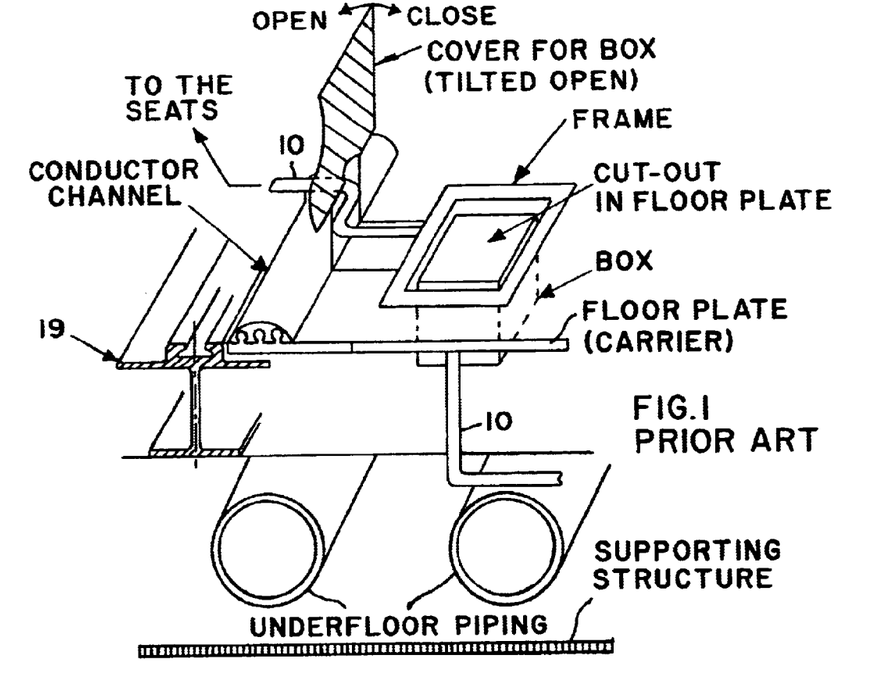
FIG. 1 is a partially sectioned schematic perspective view of a conventional conduit channel arrangement for cables of an in-flight entertainment system of an aircraft.

FIG. 1 illustrates a conventional conduit channel arrangement of the in-flight entertainment system installed in a conventional passenger aircraft, for example the Airbus A340-600 aircraft. Such a conventional conduit channel or raceway arrangement has been generally discussed above. As shown schematically in FIG. 1, in the conventional arrangement, the insulated electrical lines or cables are laid out in a channel, which is arranged and secured visibly above the aircraft cabin floor, namely next to or along a passenger seat mounting rail on the floor carpet. The channel extends in the aircraft lengthwise axis direction, to lead from one seat row to the next below the passenger seats. The conductor lines that have been laid out along the channel are covered by a simple plastic cover, which is secured on the floor. The cabling between the seats, generally known as seat-to-seat cabling, comprises data lines that are connected with a so-called seat electronic box as well as power supply lines or power cables which are responsible for the total energy supply and distribution of electrical power to the seats, through the above mentioned power floor disconnect box (PFDB). These boxes are positioned spaced away from the channel. More particularly, in order to comply with the pertinent mandatory aircraft approval regulations, these boxes are located at fixed prescribed positions within recesses or openings that are sunken into the floor structure. The boxes are set down onto a floor plate that is sunken into the floor. This plate is secured to a carrying or supporting frame that rests on the floor carpet, and that has a tiltable or pivotable lid fixed thereto. The tiltable lid simplifies the connection and the accessibility of the conductor lines that are connected with the respective box. The conductor lines extending from the box exit from this installation area through the screw-secured lid and are then guided to the seats or seat rows.

The installation of the floor disconnect boxes and power floor disconnect boxes is guided by or adapted to the particular wishes of the airline or other aircraft operator for which the aircraft is being outfitted or laid out. The particular arrangement and layout of the boxes will also have an influence on the arrangement and layout of other aspects of the aircraft assembly and outfitting. As a result, the customer's wishes regarding the layout of the boxes often leads to a great effort and cost in incorporating the layout wishes into the overall production and outfitting of the aircraft. Any changes in the layout of the boxes must also be taken into account with corresponding changes of all the affected structural plans and the like, which are influenced by the change of the location of the boxes, the floor plates, and the channel positions, as well as the relocated and potentially lengthened cable runs that would result therefrom. Such changes also lead to an overall weight increase of the aircraft.

Figure 2:
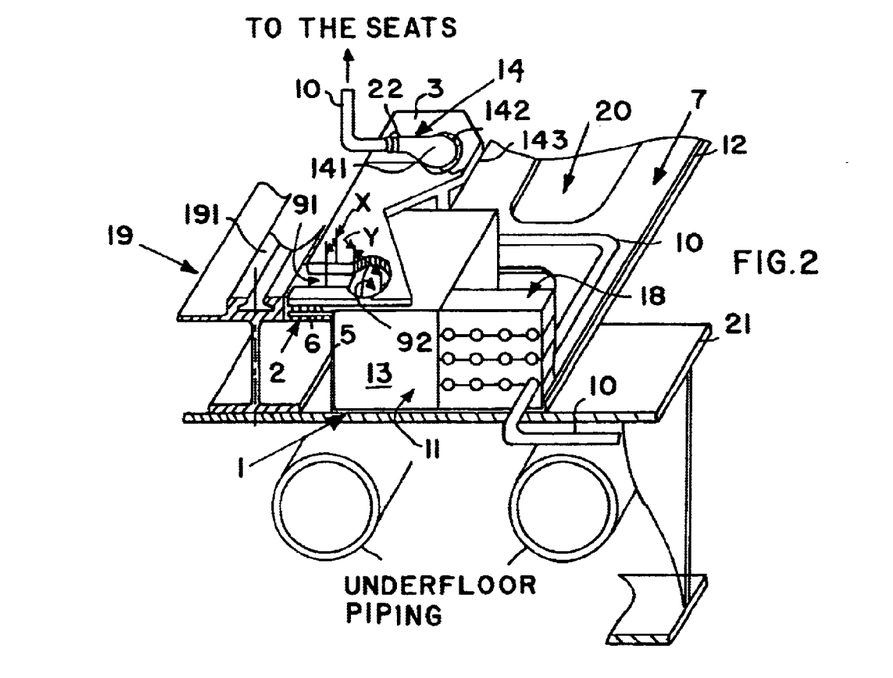
FIG. 2 is a partially sectioned schematic perspective view of the improved conduit channel arrangement for the cables and devices of an in-flight entertainment system in an aircraft according to the invention.

In comparison, the inventive conduit channel or raceway arrangement for receiving insulated conductor lines and devices of an in-flight entertainment system of an aircraft, as shown in FIG. 2, is easily adaptable to particular desires or requests of the aircraft customer, and also avoids the above discussed disadvantages and problems arising from the conventional visible arrangement of a cable channel above the cabin floor.

According to the invention, the conduit channel or raceway arrangement comprises a conduit channel or raceway 1 essentially fabricated from a longitudinally extending metal sectional member with a double-L or Z-shaped cross-section. The conduit channel 1 thus comprises a middle channel web 5, as well as an upper channel flange 6 and a lower channel flange 7 respectively protruding at right angles in opposite directions from an upper edge and a lower edge of the middle channel web 5. Particularly, in the illustration of FIG. 2, the upper channel flange 6 is oriented toward the left while the lower channel flange 7 is oriented toward the right from the middle channel web 5, whereby the upper and lower flanges 6 and 7 are simply bent from the middle web 5 respectively along an upper bent edge 171 and a lower bent edge 172, so that the complete double-L or Z-shaped cross-section of the conduit channel 1 is formed as a single integral bent metal component. The lower channel flange 7 forms the channel floor and lies and is supported on a crossbeam support surface 21 of a crosswise floor beam integrated in the structure of the floor. The crossbeam thereby supports the channel 1 in the vertical axis direction of the aircraft. The conduit channel 1 is arranged next to and extending along a profile support surface 2 of a sectional profile member 19 such as a longitudinally extending floor spar that includes or forms a seat mounting rail 191. This sectional profile member 19 is integrated into the floor structure of the cabin floor and extends in the horizontal direction along the aircraft longitudinal axis direction. The profile support surface 2 may, for example, be a side flange of the sectional profile member 19 protruding laterally from the seat track or seat mounting rail 191 on which the aircraft passenger seats are mounted.

Figures 3, 4, 5:
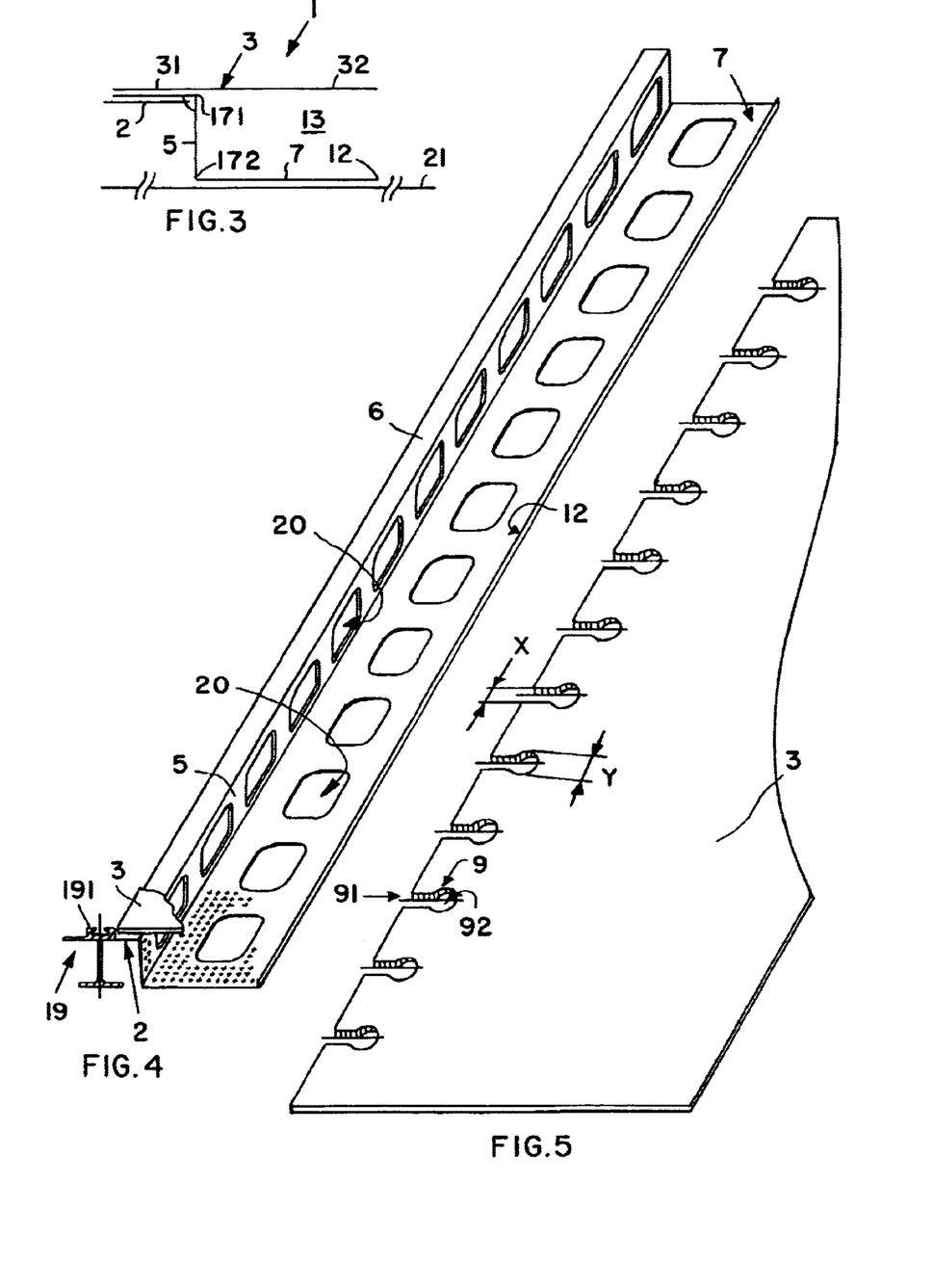
FIG. 3 is a simplified schematic sectional view of the channel arrangement according to FIG. 2, without showing the conductor lines and devices received therein.
FIG. 4 is a schematic perspective view of a portion of the channel-forming sectional member of the inventive channel arrangement.
FIG. 5 is a schematic perspective view of a portion of the inventive channel cover.

FIG. 3 shows a simplified sectional view of the channel arrangement according to FIG. 1, whereby the vertically extending middle channel web 5, the horizontally extending upper channel flange 6, and the horizontally extending lower channel flange 7 are clearly visible, with the flanges 6 and 7 bent at right angles in opposite directions from the upper and lower bent edges 171 and 172 of the middle web 5. The upper channel flange 6 rests surfacially on the profile support surface 2 of the longitudinally extending sectional profile member 19. The lower channel flange 7 rests surfacially on the horizontal support surface 21 of the crossbeam. Thereby the channel 1 is recessed into the floor and supported on the structure of the floor.

Furthermore, a short vertical narrow flange 12 is bent to protrude upwardly at the free edge of the lower channel flange 7. This narrow flange 12 extends in the aircraft longitudinal axis direction and protrudes vertically from the crossbeam support surface 21, whereby the narrow flange 12 has a strip-shaped appearance in a side elevation view, with a lower height than the vertical middle web 5. The narrow flange 12 helps to stiffen the floor of the channel 1 formed by the lower flange 7, and acts as a stop edge for positioning and retaining the conductor lines 10 and the devices 11 in the channel, while leaving the right side of the channel 1 substantially open for allowing conductor lines to be passed into and out of the channel at freely selectable locations as needed in the underfloor area.

As shown in FIGS. 2, 3, 4 and 5, the conduit channel arrangement further includes a plate-like channel cover 3 that covers the open channel profile cross-sectional area 13 of the conduit channel 1. In order to cover the open cross-sectional area 13 of the channel, the channel cover or lid 3 is arranged and rests on the top of the channel profile of the conduit channel 1, while extending along the longitudinal length thereof. In this manner, the channel cover 3 forms a floor plate set into the floor of the aircraft cabin. The channel cover 3 includes a supporting edge rim 31 that rests on the upper channel flange 6, as well as a cover portion 32 that spans over and covers the open cross-sectional area 13 of the channel 1. When the channel cover 3, forming a floor cover plate, is installed and secured in its closed position, the free edge of the supporting edge rim 31 is abutted against the side of the respective seat mounting rail 191 of the sectional profile member 19 as can be seen in FIG. 2. Furthermore, while it is not mandatory, a seal strip or other insulating or sealing means can be provided between the respective members (for example between the channel cover 3 and the upper channel flange 6) to prevent the penetration of moisture, dirt, or dust into the conduit channel 1.

A plurality of cable pass-through openings 9 are cut, notched or otherwise provided spaced apart from one another along the longitudinal axis direction in the channel cover 3. Particularly, each cable pass-through opening 9 is configured as an elongated or slotted hole 91, either with or without an enlarged cable guide hole or key hole 92 at the end thereof, whereby the elongated hole 91 extends from the rim or edge of the channel cover 3 through the edge rim 31 and into the cover portion 32 of the channel cover 3. Thus, the blind end of each cable pass-through opening 9, for example provided with a guide hole 92, is located above the open channel cross-sectional area 13 of the channel 1. Thus, as seen in FIGS. 2, 3 and 4, first the upper channel flange 6 of the conduit channel 1 and then the edge rim 31 of the channel cover 3 lie one on top of another on the profile support surface 2.

As can also be seen generally in FIG. 2 and in detail in FIGS. 6 to 9, a respective cable guide element 14 is arranged on the channel cover 3 above a respective cable pass-through opening 9 that has been selected as a location for passing a conductor line 10 out from the channel 1 to be connected to the passenger seat cabling of a respective passenger seat. The cable guide element 14 comprises a half-pipe 141 with a flange 142 protruding from the free rim or edge of the half-pipe. The flange surface (not visible) has a flange opening provided in an end thereof, which extends along the half-pipe axis with the same diameter as the half-pipe. Plural flange holes 143 are distributed around the rim of the flange 142, whereby the cable guide element 14 may be mounted by screws or the like being screwed into threaded holes or the like in the channel cover 3. Thereby, the opening of the flange 142 and the corresponding inside of the half-pipe 141 are aligned and secured over the guide hole 92 of the respective cable pass-through opening 9, and in this position, secured to "the channel cover 3. In this installed arrangement, as shown in FIG. 2, the cable guide element 14 may be sloped or angled toward the channel cover 3. In other words, the half-pipe may comprise a half-pipe elbow that deflects the conductor line by e.g. 90° upon exiting from the channel.

The cable guide element 14 thus serves to provide a deflected guidance, by about 90°, for the conductor line 10 passing out of the conduit channel 1, while simultaneously protecting the area of the cable pass-through opening 9 as well as the conductor line 10 against mechanical loading and damage, or the penetration of liquid or dirt in the area of the floor of the passenger cabin. In this regard, the cable guide element 14 covers the cable pass-through opening 9 in the manner of an arched dome or cupola. The conductor line 10 is preferably secured with a cable binder 22 to the half pipe 141 of the cable guide element 14. The channel cover plate 3 itself is fixed or secured in any conventionally suitable manner, for example by being screwed or clipped down onto the channel 1 and/or the cabin floor panels.

In the illustration of FIG. 2, an electrical or electronic device 11 and a block-shaped cable holder 18 are arranged next to each other on the lower channel flange 7 serving as a floor of the channel 1. Instead of the generally indicated electronic device 11, which could be any electrical, electronic, optical, or other device involved in the in-flight entertainment system, a floor connection box in the manner of a so-called FDB or PFDB as well as a supplemental seat electronic box (SEB) can be used and similarly arranged in the conduit channel 1. The block-shaped cable holder 18 comprises several cable holder members or parts that are stacked one on top of another, with dividing planes therebetween extending essentially horizontally in the crosswise direction of the aircraft. In the stacked arrangement of the completed cable holder 18, a plurality of holes pass through the cable holder 18 respectively along the planes between the adjacent cable holder parts, whereby these holes receive individual insulated conductor lines 10 or cables or cable bundles respectively passing therethrough, to hold the conductor lines 10 in a neatly organized and secured fashion. The conductor lines 10 are secured in the cable holder 18, after being arranged in the holes, by pressing downwardly onto the cable holder 18 in the aircraft vertical axis direction, and securing the arrangement, for example by means of the channel cover 3 that is secured to the floor on top of the conduit channel 1. The cable holders 18 also provide segregation boundaries along the length of the conduit channel 1.

From the cable holder 18, the conductor lines 10, as well as any other conductor lines extending from the device 11, for example the floor disconnect box, can extend longitudinally along the conduit channel 1 until they reach the appropriate point at which they are to exit the channel 1 to be extended and connected to the aircraft seats as a part of the seat-to-seat cabling. Particularly, the appropriate location is selected among the many available cable pass-through openings 9. Namely, at the appropriate one of the cable pass-through openings 9, the above mentioned cable guide element 14 is installed on the channel cover 3, and the respective allocated conductor line 10 is guided out of the channel through the cable guide element 14.

FIGS. 4 and 5 show the conduit channel 1, or more accurately the conductor and device channel 1, as well as the channel cover 3 as individual components for an improved clarity and understanding. The bent sheet metal sectional member forming the conduit channel 1 is provided with perforations. Namely, the middle channel web 5 and the lower channel flange 7 have several cut-out openings 20 which are spaced from one another along the longitudinal extension direction of the channel 1. These cut-out openings 20 especially serve to ventilate the conduit channel 1, in order to protect the installed devices 11 and the conductor lines 10 laid out in the channel, for example, from the accumulation of trapped heat during the operation of the devices 11 and the like. The openings 20 allow cool air to flow through the channel 1 and thereby carry away the air that has been warmed by the devices and the like in the channel. Furthermore, the cut-out openings 20 in the middle channel web 5 and the lower channel flange 7 also allow conductor lines or cables or the like to pass into and out of the channel 1 toward the side or toward the bottom in the underfloor area, in order to connect these conductor lines or cables to the devices 11 that are fixed in the channel 1.

In FIG. 5 the configuration and arrangement of the elongated cable pass-through holes 91 including the cable guide holes or keyholes 92 is clearly evident. The individual elongated holes 91 are open and notched into the edge rim 31 of the channel cover 3 and extend toward and slightly into the cover portion or cover zone 32 of the channel cover 3, where the blind end of each elongated hole 91 terminates in the adjoining cable guide hole 92, of which the hole diameter y is larger than the slot width x of the slotted or elongated hole 91.

FIGS. 6 to 9 and FIGS. 10 to 13 respectively show first and second diverse embodiments of the cable guide elements. The first embodiment of the cable guide element 14 shown in detail in FIGS. 6 to 9 has already been illustrated and discussed above in connection with FIG. 2.

The second embodiment of a cable guide element 14' shown in FIGS. 10 to 13 is especially for use in connection with a cable pass-through hole 9 that is configured only as an elongated slot or hole 91 without an enlarged keyhole or guide hole 92. The flange 142' of this embodiment of the cable guide element 14' thus has a horseshoe-shaped configuration. The inner sides of this flange 142', which surround or enclose a pass-through area for the passage of an individual conductor line 10 or cable or a line bundle, are mechanically connected through a mechanical joint, e.g. a welded joint, to the free edges of the pipe wall of a half-pipe 141'. The flange 142' is secured onto the channel cover 3 through flange holes 143' so that the passage area enclosed by the flange 142' is in registration with, i.e. aligned with, the area of the elongated slot hole 91 of the cable pass-through opening 9. In this manner, a conductor line can be passed from the channel 1 out through the elongated hole 91 while being covered and protected by the cable guide element 14'.

Figure 6:
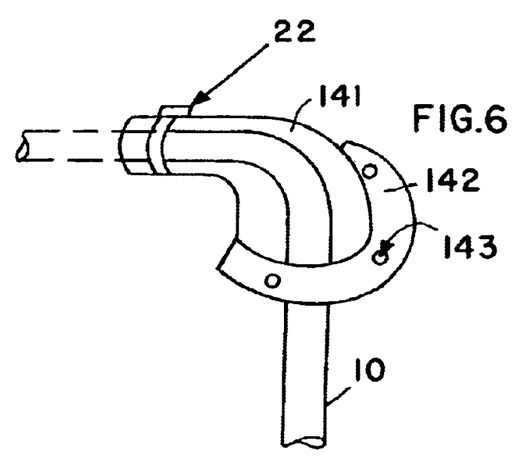
FIG. 6 is a schematic perspective view of a first embodiment of a cable guide element.
Figure 7:
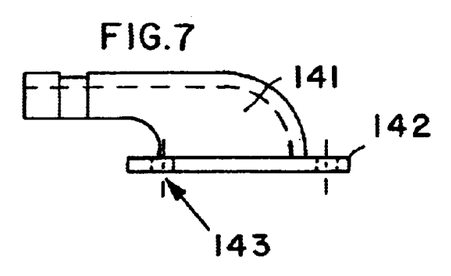
FIG. 7 is a side elevation view of the cable guide element according to FIG. 6.
Figure 8:
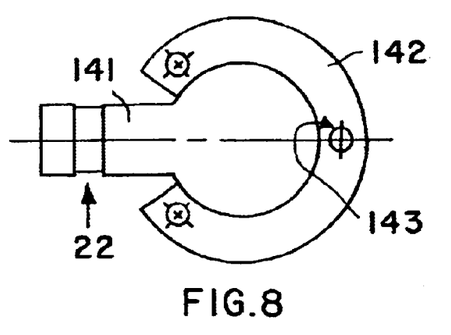
FIG. 8 is a top plan view of the cable guide element according to FIG. 6.
Figure 9:
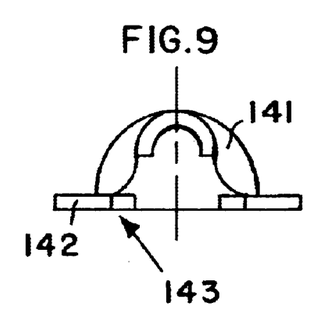
FIG. 9 is a front elevation view of the cable guide element according to FIG. 6.
Figure 10:
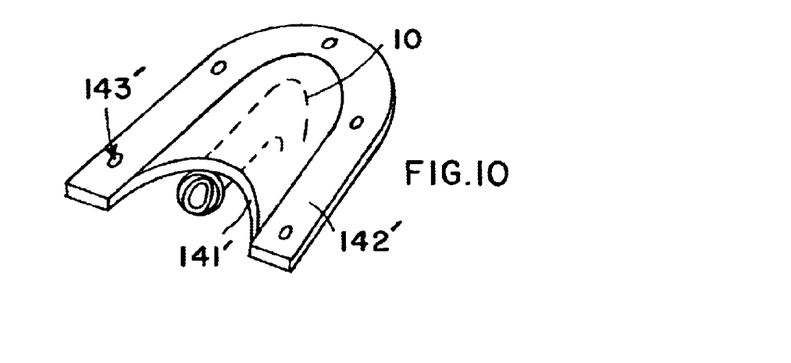
FIG. 10 is a schematic perspective view of a second embodiment of a cable guide element.
Figure 11:
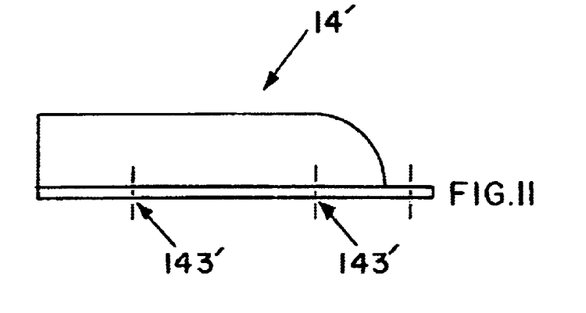
FIG. 11 is a side elevation view of the cable guide element according to FIG. 10.
Figure 12:
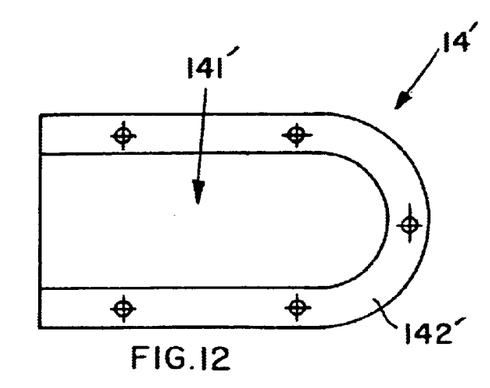
FIG. 12 is a top plan view of the cable guide element according to FIG. 10.
Figure 13:
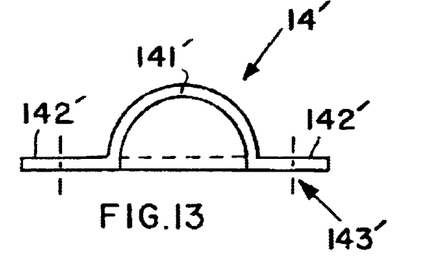
FIG. 13 is a front elevation view of the cable guide element according to FIG. 10.
Figure 16:
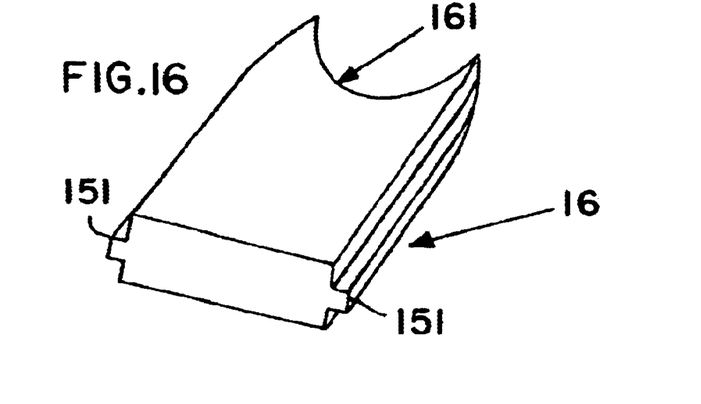
FIG. 16 is a schematic perspective view of an insert similar to the blind insert of FIG. 15, but having a semicircular hole or recess for passing a cable therethrough.

Preferably, a conductor line 10 extending out of the conduit channel 1, for example as shown in FIG. 2, is securely fixed as it passes through the elongated hole 91 of the channel cover 3, so that it is held fast against shaking or vibration or rubbing, induced by the vibrations arising in the aircraft during flight. For this purpose, a plate-shaped blind insert 16, preferably having the same material thickness as the channel cover 3, as shown in FIG. 16, is inserted slidingly into the elongated slot hole 91 in which the respective conductor line 10 passes out of the channel 1, preferably under cover of the cable guide element 14 or 14' as shown in FIG. 6 or 10.

Figure 14:
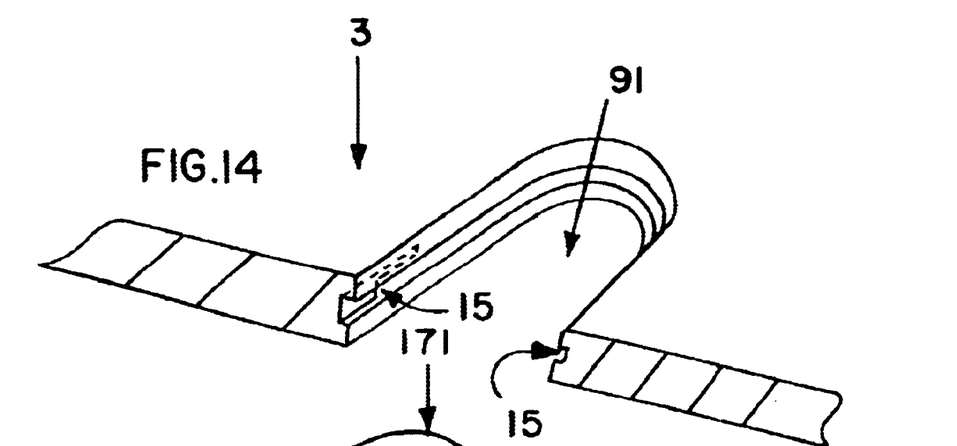
FIG. 14 is a schematic perspective view of a portion of the channel cover in the area of an elongated or slotted cable exit hole.

In this regard, the elongated hole 91 as shown in FIG. 14 is provided with a groove-like recess or recessed groove 15, preferably along the middle of the material thickness of the sidewalls. This recessed groove 15 can serve as a receiving and guiding groove for a trapezoidal protruding lip or tongue 151 provided along the edges of the blind insert 16 as shown in FIG. 16. The protruding lip or tongue 151 extends along the entire hole engaging perimeter of the blind insert 16, preferably along the plane at the center of the material thickness thereof. The protruding lip or tongue 151 achieves a press-fit in the recessed guide groove 15, so that the blind insert 16 can be slidingly pushed into the elongated hole 91 and be held in place therein. The blind inserts 16 can be made of metal, like the conduit channel 1 and the channel cover 3, or can be made of rubber or plastic or the like. The channel cover 3 could also be made of plastic or fiber reinforced composite as alternative.

The forward end of the blind insert 16 is preferably provided with a semicircular notch 161 matching the radius at the end of the elongated hole 91 or of the guide hole 92 if such a guide hole 92 is provided. Thereby, the semicircular notch 161 at the forward end of the blind insert 16 partially encircles the conductor line 10 as it leaves the channel 1 through the elongated hole 91 or the guide hole 92, and securely presses and holds the conductor line 10 against the opposite rounded sidewall of the cable pass-through opening 9.

Figure 15:
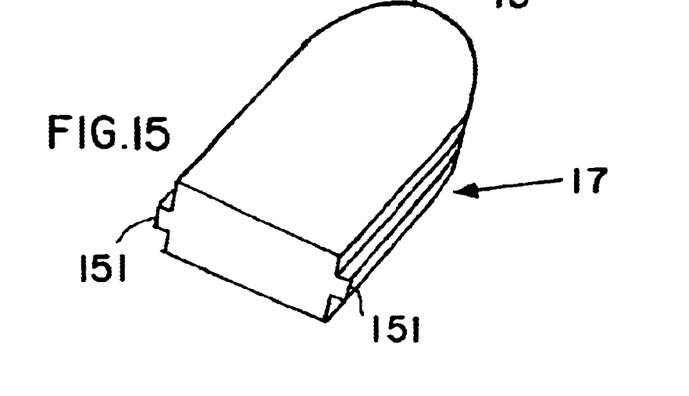
FIG. 15 is a schematic perspective view of a blind insert for closing the elongated or slotted hole when it is not in use.

As a further alternative shown in FIG. 15, a blind insert 17 has the same plane shape as the elongated hole 91, without a semicircular notch 161 at the forward end 171 thereof. Such a complete un-notched blind insert 17 can be inserted into all of the elongated holes 91 that are not being used to pass conductor lines out of the channel 1, so as to close or cover such unused cable pass-through openings 9.

Since the conduit channel 1 itself is made of a light metal, and particularly is a sectional member bent from a sheet metal plate or sheet, the channel 1 is electrically conductive and can provide lightning strike protection as well as electromagnetic compatibility (EMC) shielding for the conductor lines 10 and the devices 11 installed therein. For this purpose, the metal sectional member forming the conduit channel 1 is electrically grounded by being connected to the metal structure of the aircraft airframe, for example via the crossbeams providing the crossbeam support surfaces 21.

Although the sectional shape of the conduit channel 1 has been described as a double-L profile or a Z profile, it can also be understood as a U profile lying on its side, i.e. open toward the right in FIGS. 2, 3 and 4, whereby the channel cover 3 forms one of the closed sides or shanks of the U-sectional profile.

The inventive conduit channel arrangement as disclosed herein provides a very flexibly adaptable arrangement for locating, securing, and protecting various conductor lines 10 and devices 11 as required throughout the passenger cabin, in a protected and unobtrusive location flushly recessed into the cabin floor. The provision of the continuously longitudinally extending conduit channel 1 thus replaces or avoids the need of several individual floor disconnect boxes arranged at fixed locations along the longitudinal direction of the cabin floor. Thus, the layout of the devices 11 and conductor lines 10 does not need to be decided or specified at the initial stages of the design, layout and construction of the aircraft and outfitting of the cabin, but rather can be flexibly adapted as required during the cabin outfitting phase. It is also possible to carry out future modifications of the cabin layout and/or of the devices and conductor lines needed by the respective in-flight entertainment system, without needing to carry out extensive, complicated, and costly reconstruction of the cabin floor with individual floor disconnect boxes.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a transport aircraft having an electrical or optical system incorporating insulated conductor lines and devices, and having a fuselage that extends longitudinally in a longitudinal axis direction and that includes a cabin floor incorporating a crossbeam with a horizontal crossbeam surface extending in a transverse direction transversely across said longitudinal axis direction and a sectional structural member with a horizontal structural member surface extending along said longitudinal axis direction,
a conduit channel arrangement that is adapted to receive said insulated conductor lines and said devices of said electrical or optical system, and that comprises a sectional channel member and a cover plate, wherein:
said channel member comprises a vertical middle web, a horizontal upper flange bent and protruding integrally laterally from an upper edge of said middle web, and a horizontal lower flange bent and protruding integrally laterally from a lower edge of said middle web in a lateral direction opposite said upper flange;
said channel member extends longitudinally along said longitudinal axis direction adjacently along said sectional structural member;
said lower flange defines a bottom and said middle web defines a side boundary of a channel space extending longitudinally along said channel member;
said lower flange is supported on said horizontal crossbeam surface;
said upper flange is supported on said horizontal structural member surface;
said conductor lines and said devices are arranged in said channel space;
said cover plate extends longitudinally in said longitudinal axis direction, and is movably or removably arranged on said channel member to cover said channel space, whereby an edge rim of said cover plate is arranged and supported on said upper flange and a cover portion of said cover plate spans over and covers said channel space; and
a plurality of cable pass-through openings are provided spaced apart from one another along said longitudinal axis direction in said cover plate, and are adapted to allow one or more of said conductor lines respectively to pass therethrough.

2. The conduit channel arrangement in the aircraft according to claim 1, wherein said electrical or optical system comprises an in-flight entertainment system.

3. The conduit channel arrangement in the aircraft according to claim 1, wherein said channel member is an integral sheet metal sectional member of a lightweight metal bent to form said upper flange, said middle web and said lower flange with a double-L sectional shape.

4. The conduit channel arrangement in the aircraft according to claim 3, wherein cut-out openings are provided distributed along said longitudinal axis direction in at least one of said middle web and said lower flange.

5. The conduit channel arrangement in the aircraft according to claim 1, wherein said channel member further comprises a narrow strip-shaped flange that extends longitudinally in said longitudinal axis direction, protrudes vertically upwardly from a free edge of said lower flange opposite said middle web, and has a smaller vertical height than said middle web.

6. The conduit channel arrangement in the aircraft according to claim 1, wherein each one of said cable pass-through openings respectively comprises an elongated slot hole that opens at a free longitudinal edge of said edge rim of said cover plate and extends in said transverse direction through said edge rim and at least partially into said cover portion of said cover plate.

7. The conduit channel arrangement in the aircraft according to claim 6, wherein each said cable pass-through opening respectively further comprises a cable guide hole joined to and terminating said elongated slot hole at an end of said elongated slot hole in said cover portion of said cover plate above said channel space.

8. The conduit channel arrangement in the aircraft according to claim 7, wherein each said cable pass-through opening has a keyhole-shape with said cable guide hole having a diameter larger than a slot width of said elongated slot hole.

9. The conduit channel arrangement in the aircraft according to claim 7, further comprising a cable guide element arranged on said cover plate over a respective one of said cable pass-through openings, wherein said cable guide element comprises a half-pipe and an open flange at an end thereof, and said open flange is secured onto said cover plate along an edge of said cable guide hole.

10. The conduit channel arrangement in the aircraft according to claim 9, wherein said half-pipe comprises a half-pipe elbow that deflects said cable guide element through a bend.

11. The conduit channel arrangement in the aircraft according to claim 9, wherein said half-pipe has an open side that faces downwardly toward said cover plate.

12. The conduit channel arrangement in the aircraft according to claim 6, wherein said elongated slot hole terminates at a U-shaped half-round hole end in said cover portion of said cover plate above said channel space, and said slot hole does not have an enlarged keyhole at said hole end thereof, further comprising a cable guide element arranged on said cover plate over a respective one of said cable pass-through openings, wherein said cable guide element comprises a half-pipe and a horseshoe-shaped open flange on an open side of said half-pipe, and said open flange is secured onto said cover plate along side edges of said elongated slot hole.

13. The conduit channel arrangement in the aircraft according to claim 6, wherein a recessed groove is provided in a sidewall surface of said cover plate bounding a side of said elongated slot hole of one of said cable pass-through openings, and further comprising an insert plate slidingly engaged in said recessed groove to at least partially fill said elongated slot hole.

14. The conduit channel arrangement in the aircraft according to claim 13, wherein said one of said cable pass-through openings is not used for passing any of said conductor lines therethrough, and said insert plate entirely fills said one of said cable pass-through openings.

15. The conduit channel arrangement in the aircraft according to claim 13, wherein an end of said insert plate has an arc-shaped open notch therein, said arc-shaped open notch leaves open a hole area of said one of said cable pass-through openings when said insert plate is fitted into said one of said cable pass-through openings, and one or more of said conductor lines pass through said hole area.

16. The conduit channel arrangement in the aircraft according to claim 15, wherein said one of said cable pass-through openings further comprises a cable guide hole joined to and terminating said elongated slot hole at an end thereof, and said arc-shaped open notch has a diameter matching a diameter of said cable guide hole.

17. The conduit channel arrangement in the aircraft according to claim 1, wherein said upper flange is arranged directly on and lies flat on said horizontal structural member surface, and said lower flange is arranged directly on and lies flat on said horizontal crossbeam surface.

18. The conduit channel arrangement in the aircraft according to claim 1, wherein said sectional structural member further comprises a seat mounting rail protruding upwardly from said horizontal structural member surface and extending longitudinally along said longitudinal axis direction, and wherein a free longitudinal, edge of said upper flange is horizontally butted against a side of said seat mounting rail.

19. The conduit channel arrangement in the aircraft according to claim 1, wherein said devices are box-like devices incorporating electronics therein, said devices are distributed spaced from one another over a length of said channel space in said longitudinal axis direction, and further comprising cable holders that securely hold said conductor lines and that are distributed spaced from one another over said length of said channel space in said longitudinal direction, next to, below, or above said devices.

* * * * *